Oct. 31, 1939.  F. A. CHAPMAN  2,177,800
NUT LOCK
Filed Oct. 18, 1937
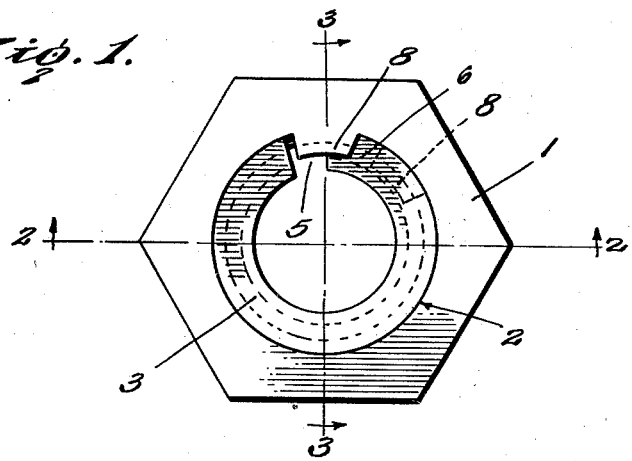
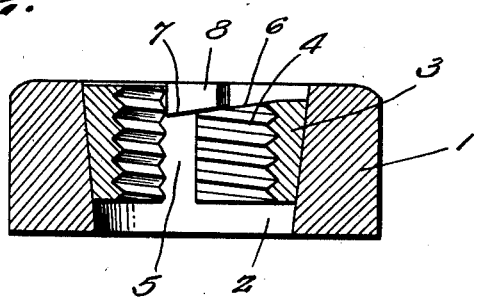
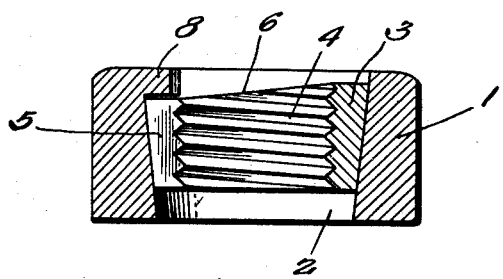
Inventor
F. A. Chapman.
By Lacey & Lacey,
Attorneys Patented Oct. 31, 1939

2,177,800

UNITED STATES PATENT OFFICE 2,177,800

NUT LOCK

Fred A. Chapman, Hillsboro, Wis.

Application October 18, 1937, Serial No. 169,741

6 Claims. (Cl. 151—19)

This invention relates to a nut lock and it is one object of the invention to provide a nut having means associated therewith which will serve very effectively to create binding engagement with threads of a bolt and prevent the nut from working loose after it has been screwed tightly into place.

Another object of the invention is to provide a nut lock wherein the nut is formed with an unthreaded bore tapered towards its inner or rear end and receiving a split bushing or gripping member which is similarly tapered and internally threaded for engagement with the threads of a bolt, the nut being provided with means for forcing the bushing inwardly so that it will have tight gripping engagement with threads of the bolt when the nut and the bushing are screwed upon the bolt and tightened.

It is another object of the invention to so form the bushing and so associate the nut-carried bushing adjusting member that, when the nut and bushing are turned in a direction to tighten the nut upon the bolt, the bushing will be forced to a position in which it will be tightened about the bolt while, when the nut is turned in a reverse direction to remove it from the bolt, the bushing will be turned in the proper direction to unthread it from the bolt and thus permit easy removal of the nut when so desired.

The invention is illustrated in the accompanying drawing, wherein—

Figure 1 is a view looking at the outer end of the improved nut lock,

Figure 2 is a sectional view taken through the nut lock along the line 2—2 of Figure 1, and Figure 3 is a view similar to Figure 2 taken along the line 3—3 of Figure 1.

The nut 1 is formed of strong metal and may be of any dimension necessary to accommodate it to a bolt with which it is to be used. A bore 2 is formed through the nut concentric thereto, and upon referring to Figures 2 and 3, it will be seen that this bore is gradually reduced in diameter so that it tapers from the outer end of the nut to the inner end thereof and thus provides a constricted pocket in which a bushing 3 is mounted. The bushing is also formed of strong metal and has its bore threaded, as shown at 4, so that it may have threaded engagement with a bolt to which the nut is to be applied. The threaded bore of the bushing is of an even diameter throughout its length but externally the bushing is tapered from its outer end to its inner end in conformity to the taper of the unthreaded bore of the nut. It will thus be seen that, when the bushing is shifted longitudinally of the bore or pocket 2 of the nut, the ends of the bushing which are spaced from each other by the slit 5 formed longitudinally of the bushing may be moved towards each other and the bushing contracted and caused to have tight gripping engagement with the threaded end of a bolt upon which the nut is applied. The outer end face of the bushing is formed with a sloping surface 6 which extends circumferentially of the bushing for the major portion of the circumference thereof, thus providing a cam surface for engagement by the sloping under face 7 of a lug 8 carried by and preferably formed integral with the nut at the outer end of its bore. This lug is elongated circumferentially of the nut and the angle at which its sloping under face extends is such that it substantially conforms to the slope of the cam surface 6. The length of the lug is appreciably greater than the width of the slit 5 formed in the bushing and, therefore, when the bushing is in the position shown in the drawing with one end abutting an end of the bushing at one side of the slit, the other end portion of the lug will overlap the cam surface 6. Although the manner of assembling the lock nut would appear obvious, it is thought that a brief statement relating thereto will not be out of place. Preliminary to installing the bushing 4, the lug 8 extends vertically, in the same plane with the outer wall of the nut 1. It will be understood that the bushing may be freely fitted within the opening in the nut. After the bushing is in place, the lug is hammered to the position shown in the drawing, where it will overlie a portion of the upper edge of the bushing.

When this improved nut lock is in use, a bolt is passed through openings formed in the work to be secured and the nut then applied to the projecting threaded end of the bolt and turned so that the threads of the bushing will engage the threads of the bolt. Rotary motion in this direction is continued until the nut has been screwed upon the bolt a sufficient distance to bring the inner or rear end of the nut into engagement with the confronting surface of the work to be secured. Movement of the nut towards the work will thus be brought to a stop but when the turning motion is continued the lug 8 will be moved along the cam surface 6 and as it moves along this surface force will be exerted to urge the bushing towards the inner end of the bore or pocket 2 of the nut. The bushing will thus be advanced towards the restricted end of the bore or pocket 2 and force will be exerted to contract the bushing about the threaded end of the bolt and thus cause the threads of the bushing to have tight gripping engagement with the threads of the bolt. The bushing will be moved into tight gripping engagement with the threads of the bolt before its inner end reaches the inner or rear end of the bore 2 of the nut 1 and proper gripping of the threads of the bolt will thus be assured. It will thus be seen that the bolt will be very firmly held in place and prevented from working loose. When it is desired to remove the nut, it is merely necessary to turn the nut in a reverse direction and it will be turned about the bushing until the larger end of the lug again makes contact with the end face of the bushing at the opposite side of the slit 5 from the cam surface 6. The bushing will then be turned with the nut and unscrewed from the bolt. It will thus be seen that, while the nut will be very firmly held in place and prevented from accidentally working loose, it can be removed when so desired.

Having thus described the invention, what is claimed as new is:

1. In a nut lock structure, a nut formed with a round unthreaded bore gradually reduced in diameter towards its rear end to form a constricted pocket, a slit bushing fitted into said pocket and being externally unthreaded and tapered to conform to the taper of the pocket, the bushing being internally threaded for engagement with threads of a bolt and having its outer end formed with a cam surface sloping circumferentially of the bushing from one side of the slit of the bushing for a major portion of the circumference of the bushing, and a lug formed integral with said nut and projecting radially of the nut into the pocket, said lug extending circumferentially of the nut a distance greater than the width of the slit in the bushing and having its under surface conforming to the slope of the outer end face of the bushing and contacting with the same for forcing the bushing towards the rear end of the pocket and effecting contraction of the bushing about a bolt to cause tight binding between the threads of the bushing and threads of the bolt.

2. In a nut lock structure, a nut formed with a round unthreaded bore tapered towards its rear end, a bushing fitted within the bore of the nut and being externally tapered to conform to the taper of the bore of the nut and internally threaded for engagement with threads of a bolt, said bushing being formed with a longitudinally extending slit, and a lug projecting from the nut radially of the bore from the nut and disposed in overlying relation to the outer end of the bushing, said lug being of a length greater than the width of the slit in the bushing and the bushing having its outer end formed with a sloping cam surface leading from one side of the slit and making contact with the inner face of the lug.

3. In a nut lock structure, a nut formed with a round bore tapered towards its rear end and defining a pocket, a bushing fitting within the pocket and of appreciably less length than the depth of the pocket, said bushing being internally threaded for engagement with a nut and being formed with longitudinally extending slit and having its outer end face formed with a circumferentially extending cam surface leading from one side of the slit, and a lug carried by said nut in position to act against the cam surface and force the bushing towards the inner end of the pocket when the nut and bushing are turned in a tightening direction upon a bolt, the lug being of greater length than the width of the slit in the bushing and adapted to engage the bushing at the opposite side of the slit to unscrew the bushing from a bolt when the nut is turned in a direction for removing the same.

4. In a nut lock structure, a nut formed with a round bore constricted towards the inner end of the nut, a bushing received in said bore and internally threaded for engagement with threads of a bolt, said bushing having a cam surface at one end, and a lug carried by the nut for acting against the cam surface of the bushing and urging the bushing towards the inner end of the bore when the nut and bushing are applied to a bolt and the nut turned in a tightening direction relative to the bushing.

5. In a nut lock structure, a nut formed with a round bore constricted towards its inner end, an internally threaded slit bushing in said bore adapted to be constricted when moved towards the inner end of the bore, said bushing having a cam surface at one end, and a lug carried by the nut for forcing the bushing towards the inner end of the bore when the nut is turned in a tightening direction relative to the bushing, said lug being disposed in position for engaging the cam surface of the bushing and turning the bushing in a direction to unscrew it from a bolt when the nut is turned in a loosening direction.

6. In a nut lock structure, a nut having a round bore therein, a slit bushing in said bore, the bushing being internally threaded for engagement with threads of a bolt and having a cam surface, the nut being provided with a lug having a tapered surface for engaging the cam surface and shifting the bushing longitudinally of the nut when the nut is turned in a tightening direction and having an end surface for engaging and turning the bushing in a direction to unscrew it from the bolt when the nut is turned in a loosening direction.

FRED A. CHAPMAN.